(12) United States Patent
Bruyere

(10) Patent No.: US 10,151,284 B2
(45) Date of Patent: Dec. 11, 2018

(54) PRESSURE REGULATOR FOR A HIGH-PRESSURE RAIL OF A FUEL INJECTION SYSTEM

(71) Applicant: Robert Bosch GmbH, Stuttgart (DE)

(72) Inventor: Lionel Bruyere, Lyons (FR)

(73) Assignees: Michael Best & Friedrich LLP; Robert Bosch GmbH

( * ) Notice: Subject to any disclaimer, the term of this patent is extended or adjusted under 35 U.S.C. 154(b) by 0 days.

(21) Appl. No.: 15/538,834

(22) PCT Filed: Dec. 22, 2015

(86) PCT No.: PCT/EP2015/080916
§ 371 (c)(1),
(2) Date: Jun. 22, 2017

(87) PCT Pub. No.: WO2016/102532
PCT Pub. Date: Jun. 30, 2016

(65) Prior Publication Data
US 2017/0350355 A1    Dec. 7, 2017

(30) Foreign Application Priority Data
Dec. 23, 2014  (FR) .................................... 14 63194

(51) Int. Cl.
*F02M 37/00* (2006.01)
*F02M 63/00* (2006.01)
(Continued)

(52) U.S. Cl.
CPC .... *F02M 37/0052* (2013.01); *F02M 61/1873* (2013.01); *F02M 63/0052* (2013.01);
(Continued)

(58) Field of Classification Search
CPC ................................................. F02M 37/0052
See application file for complete search history.

(56) References Cited

U.S. PATENT DOCUMENTS

| 5,230,364 A | * | 7/1993 | Leng | ...................... F16K 17/06 |
| | | | | 137/514 |
| 5,295,469 A | * | 3/1994 | Kariya | ............... F02M 63/0007 |
| | | | | 123/456 |

(Continued)

FOREIGN PATENT DOCUMENTS

| EP | 0508575 | 10/1992 |
| EP | 2333303 | 6/2011 |

(Continued)

OTHER PUBLICATIONS

International Search Report for Application No. PCT/EP2015/080916 dated Mar. 15, 2016 (English Translation, 3 pages).

*Primary Examiner* — Hieu T Vo
*Assistant Examiner* — Sherman Manley
(74) *Attorney, Agent, or Firm* — Michael Best & Friedrich LLP

(57) ABSTRACT

The invention relates to a pressure regulator for a high-pressure ramp of a system for injecting fuel into an internal combustion engine, comprising a solenoid valve element (10) which receives an electromagnet (40). The electromagnet controls a needle (20) that closes a valve seat (30) which is connected to a high-pressure inlet and opens into a discharge chamber (13), said discharge chamber communicating with a liquid recirculation system (5) by means of outlet openings (14). The rear face (12) of the solenoid valve element (10) receives a coil (40) which controls the opening process of an armature (41) that is rigidly connected to the needle (20) and is subject to a closing return spring (25). The discharge chamber (13) is located on the front face (11) of the solenoid valve element (10) on the axis (XX) of the needle (20), and the discharge chamber surrounds the needle. A cavity (15) passes through the discharge chamber, said cavity receiving an inlet valve element (50), and a bore (51) which opens into the valve seat (30) passes axially (Continued)

through the inlet valve element. The discharge chamber (13) through which the needle (20) passes axially and the outlet openings (14) which are connected to the liquid recirculation system open transversally into a wall (131) in the discharge chamber (13) below the upper part (132) of the chamber. The regulator is characterized that the regulator comprises an annular expansion (70) of the discharge chamber (13) below the outlet openings (14) along the extension of a conical surface (31), which forms the valve seat (30) and an annular dead volume (70), above the surface (54) of the valve element (50), which forms the base of the discharge chamber (13) and has the valve seat (30) in the center of the valve element.

5 Claims, 4 Drawing Sheets

(51) Int. Cl.
    *F02M 63/02*      (2006.01)
    *F02M 61/18*      (2006.01)
    *G05D 16/20*      (2006.01)

(52) U.S. Cl.
    CPC ...... *F02M 63/0077* (2013.01); *F02M 63/023* (2013.01); *F02M 63/025* (2013.01); *G05D 16/202* (2013.01)

(56) References Cited

U.S. PATENT DOCUMENTS

| | | | |
|---|---|---|---|
| 9,677,524 B2* | 6/2017 | Marechal | F02M 63/0036 |
| 2007/0034819 A1* | 2/2007 | Mitsumata | F02M 63/0015 251/129.14 |
| 2007/0084443 A1* | 4/2007 | Nonoyama | F02M 51/005 123/458 |
| 2010/0018501 A1* | 1/2010 | Bitter | F02M 63/0015 123/458 |
| 2010/0282212 A1* | 11/2010 | Shafer | F02D 41/3863 123/456 |
| 2011/0140016 A1* | 6/2011 | Roth | F02M 59/466 251/129.02 |
| 2013/0221137 A1* | 8/2013 | Gruhl | F02M 63/0036 239/584 |

FOREIGN PATENT DOCUMENTS

| | | |
|---|---|---|
| JP | 2004011448 | 1/2004 |
| JP | 2007040106 | 2/2007 |

* cited by examiner

PRESSURE REGULATOR FOR A HIGH-PRESSURE RAIL OF A FUEL INJECTION SYSTEM

BACKGROUND OF THE INVENTION

The present invention relates to a pressure regulator for a high-pressure rail of a system for injecting fuel into an internal combustion engine, comprising a solenoid valve body, which accommodates a solenoid, which controls the needle that closes the valve seat, which is connected to the high-pressure inlet and opens into a discharge chamber, which communicates through outlet apertures with the liquid return circuit, wherein the rear side of the solenoid valve body accommodates the coil, which controls the opening of the rotor or armature, which is fixedly connected to the needle and is subject to a closing return spring, wherein the front side of the solenoid valve body, in the axis of the needle, comprises the discharge chamber, which extends through a cavity accommodating an inlet valve body, passing axially through which is the bore which opens into the valve seat, wherein this valve body is flanged into the cavity, wherein the discharge chamber, through which the needle axially passes, and the outlet apertures, which are connected to the liquid return circuit, open transversally into the wall in the discharge chamber below the upper part of the chamber.

A pressure regulator of the type defined above already exists. This known regulator has the disadvantage that it does not allow any optimization of the flow/pressure curve, which is in theory linear but which in practice is subject to an abrupt increase in the gradient, owing to the static pressure in the upper part of the discharge chamber.

SUMMARY OF THE INVENTION

The object of the present invention is to develop a pressure regulator for a high-pressure rail of a fuel injection system, which allows optimization of the flow/pressure curve for a more efficient regulation and liquid return in operation.

To this end, the object of the invention is directed towards a pressure regulator of the type defined above, characterized in that above the surface of the valve body, which forms the base of the discharge chamber and has the valve seat at its center, the pressure regulator comprises an annular enlargement of the discharge chamber below the outlet apertures in the extension of the conical surface which constitutes the valve seat and forms an annular dead volume.

The pressure regulator according to the invention has the advantage that the dead volume, which is developed in the part of the discharge chamber around the valve seat, is situated directly at the liquid outlet and therefore makes it possible to absorb the kinetic energy of the liquid and to reduce the static pressure in the upper part of the discharge chamber, so that this pressure approximates to the pressure of the liquid return circuit, to which the regulator is connected.

According to another advantageous feature, the valve body is accommodated in the cavity at the end of the solenoid valve body with the insertion of an annular shim, the inside diameter of which has a recess and defines at least a part of the height of the dead volume.

According to another advantageous feature, the valve body is flanged into the cavity of the solenoid valve of the regulator.

This embodiment of the regulator facilitates the design and production of the dead volume.

BRIEF DESCRIPTION OF THE DRAWINGS

The present invention is described in more detail below with the aid of one embodiment of a pressure regulator, which is represented in the drawings attached, in which.

DETAILED DESCRIPTION

Figure 1:
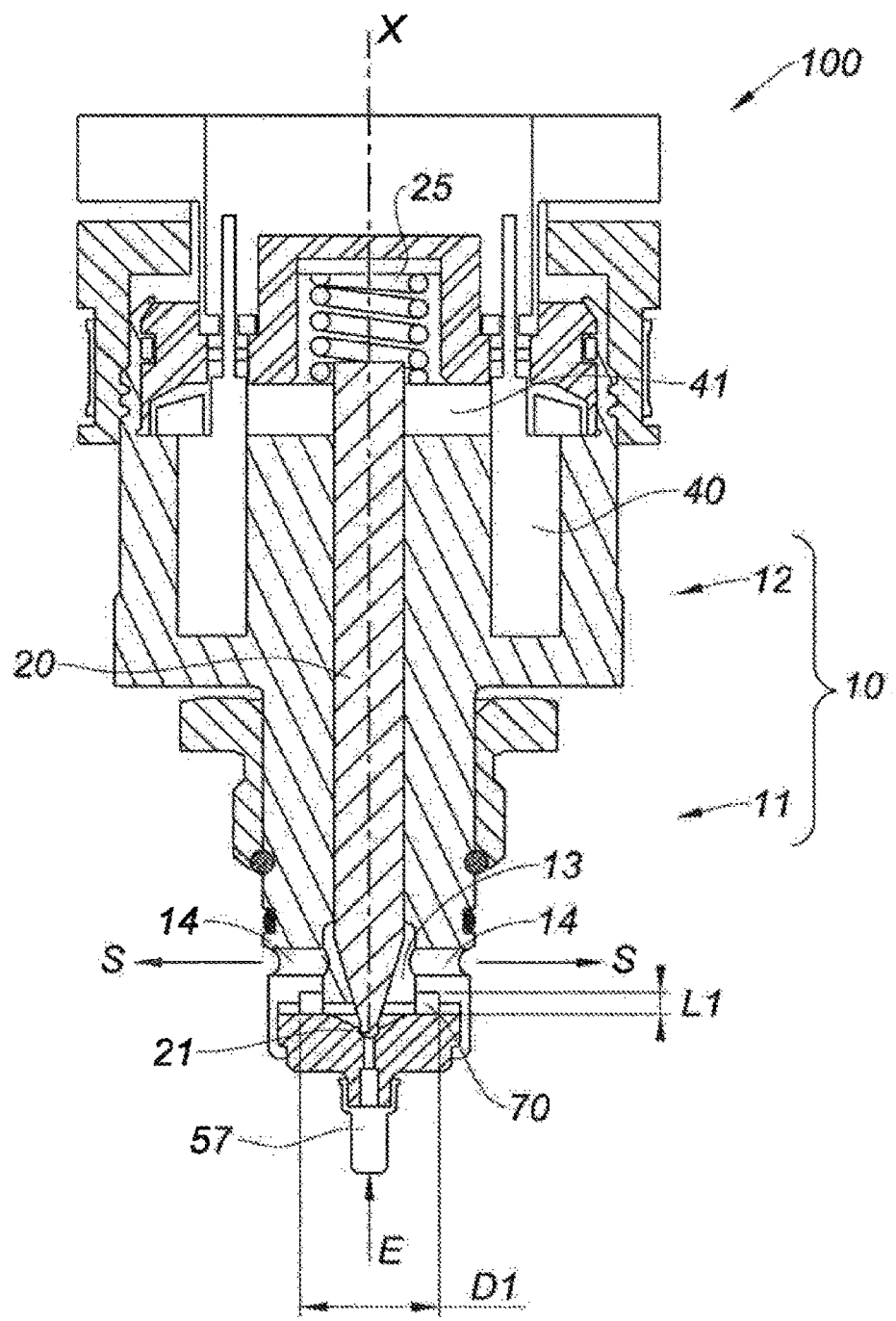
FIG. 1 is an axial sectional view of one embodiment of a pressure regulator.

According to FIG. 1 the object of the invention is directed towards a pressure regulating solenoid valve 100, which is referred to simply as a pressure regulator; it is connected to the common injection rail of a high-pressure injection system of an internal combustion engine.

The pressure regulator 100 comprises a solenoid valve body 10 having an overall rotational shape about an axis XX, which extends along a needle-shaped piston 20, which interacts with a valve seat 30 via a ball 21, which is actuated by the needle, which rests against the valve seat 30.

The solenoid valve body 10 is equipped with a solenoid 40, in order to act on a rotor or armature 41 in disk form, which is fixedly connected to the needle 20 and controls the opening movement of the needle. A return spring 25, which is coaxial with the needle 20, acts on the rotor 41 and in the closing direction.

The front end 11 of the solenoid valve body 10 is situated opposite the rear end 12, which is the end that is equipped with the solenoid valve and that accommodates the rotor 41. The front end 11, through which the return liquid passes, comprises a discharge chamber 13, which is provided with apertures 14 for the discharge of liquid to the return circuit, and on the front side a cavity 15 accommodates a valve body 50, which is flanged into the cavity.

The discharge chamber 13 is bounded by a cylindrical wall 131 about the axis XX. Transverse bores open into the chamber 13 through the apertures 14 in a direction substantially perpendicular to the axis XX of the discharge chamber 13. These apertures 14 open into the cylindrical wall 131, wherein they leave a volume in the upper part 132 of the chamber along the orientation of the figures. The valve body 50 has an axial inlet bore 51 passing through it, which communicates with the high-pressure circuit of the common rail and continues through a bore 52 of reduced cross section, which opens into the valve seat 30 with a truncated cone overall shape oriented along the axis XX.

The inlet direction of the liquid is illustrated by the arrow E, and the outlet direction through the bores 14 by the arrows S.

The valve body 50 is accommodated by its cylindrical solenoid valve body in the cavity 15 with the insertion of an annular shim 60, which allows the closing position of the needle 20 and its rotor 41 to be adjusted in relation to the solenoid 40; the shim 60 make it possible to regulate the air gap that remains when the needle 20 and the rotor 40 are in the closed position, in order to compensate for the production and joining tolerances of the components of the regulator.

The cylindrical inner surface 61 of the annular shim 60, the base 151 of the cavity 15, the recess 152 define a dead volume 70, which is shown for its cross section and which is situated in the extension of the conical surface 31 or more or less conical surface of the valve seat 30. This dead volume 70 has a larger cross section than the discharge chamber 13, which lies beyond the dead volume 70 along the axis XX.

The recess 152 in the base 151 of the cavity 15 is produced, for example, by milling with the same diameter as that of the dead volume 70.

Figure 2A:
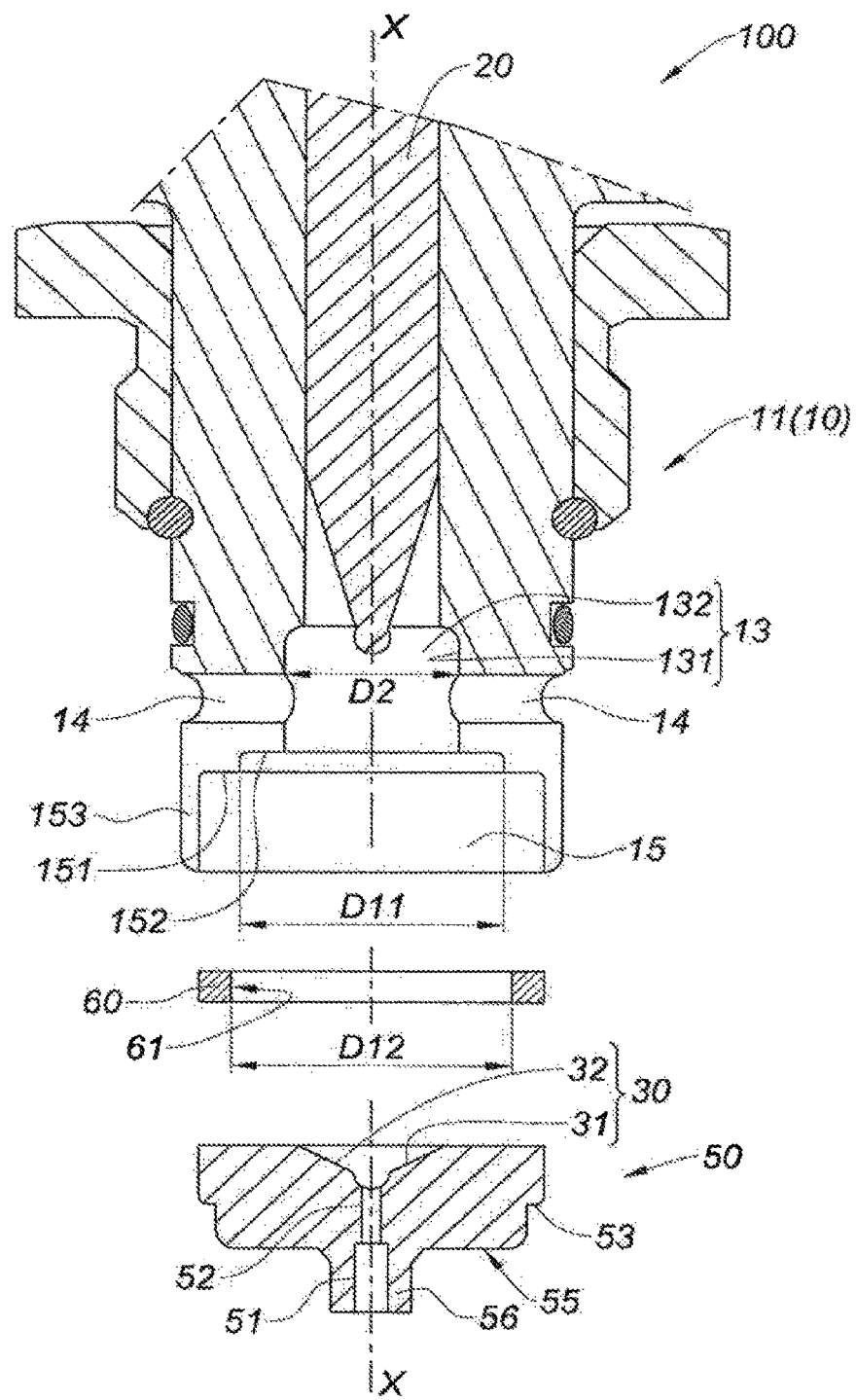
FIG. 2A shows the ununited front side

FIG. 2A shows, together with the valve body 50, which does not engage in the cavity 15, the shape of the various elements: the discharge chamber 13, the cavity 15 with its base 151 and its recess 152, and the wall 153, the edge of which is turned over for flanging of the inlet valve body 50.

Figure 2B:
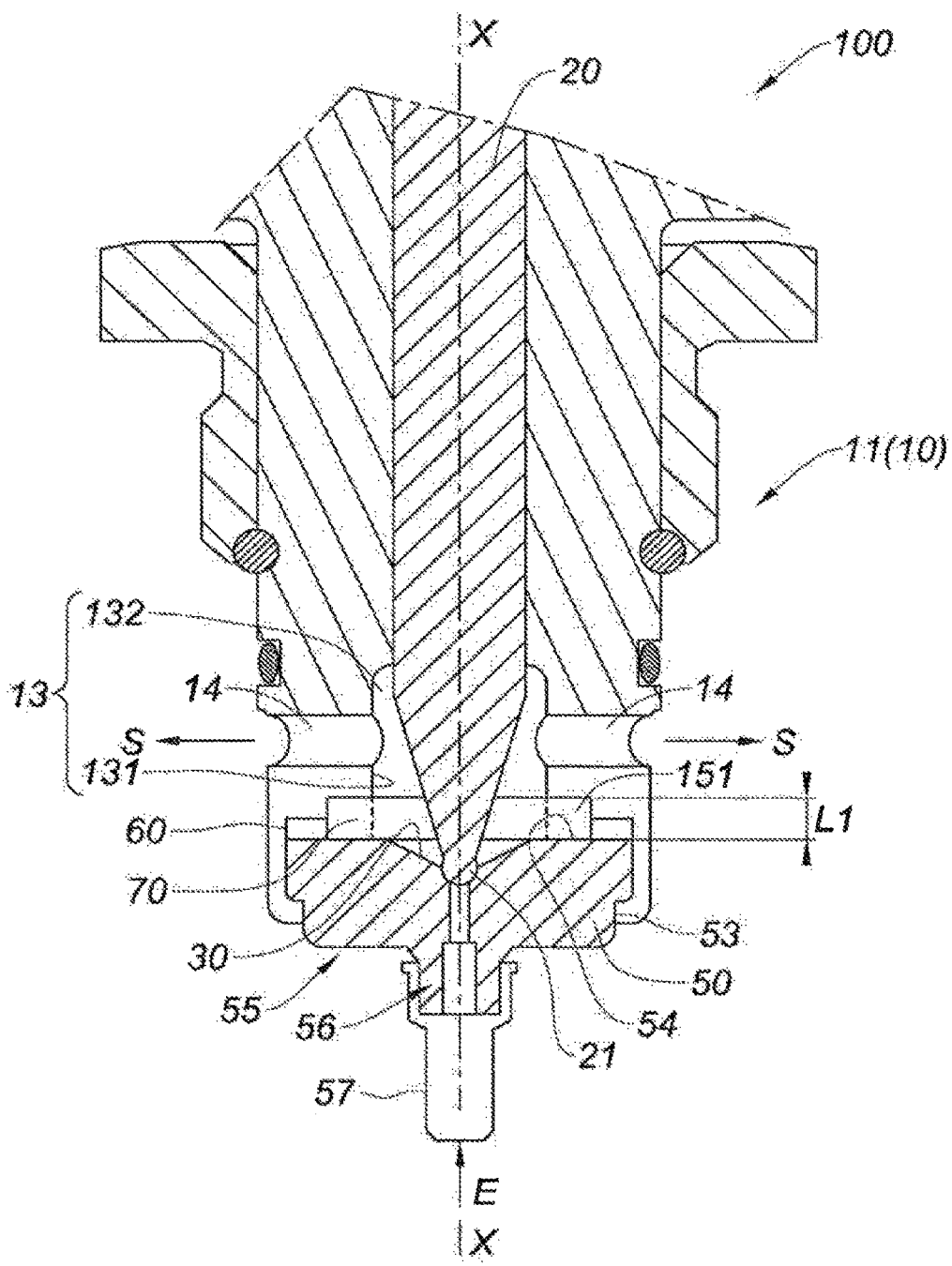
FIG. 2B shows the united front side also with the shim.

The valve body 50 is represented with its axial inlet bore 51 and its bore of reduced cross section 52, which extends the inlet bore 51, together with the conical surface 31 of the valve seat 30 and the inlet of spherical cup shape 32, which accommodates the ball 21 and thereby forms the sealing step of the valve 30. The external contour of the valve body 50 forms a flange shoulder 53. The upper side 54 of the valve body 50 is flat, and the underside 55 comprises a sleeve 56, which accommodates a screen filter 57 (FIG. 2B). The upper side 55 ensures sealing with the high-pressure rail.

FIG. 2B shows the end 11 of the solenoid valve body 10, which is joined to the valve body 50, which in the cavity 15 is joined by flanging with the insertion of the shim 60. The dead volume 70 is therefore defined by the cavity of the solenoid valve body 10 of the regulator, its milled recess 152, the annular shim 60 and the inside 54 of the valve body 50.

The characteristic dimensions of the annular dead volume 70 of rectangular cross section are indicted with diameter $D_1$ and axial length $L_1$ along the axis XX. The dead volume 70 generally has two diameters $D_{11}$, $D_{12}$ $D_{11}$ is the diameter of the recess 152 and $D_{12}$ is the inside diameter of the annular shim 60.

These two diameters may be equal, but need not necessarily be so. The "diameter" of the dead volume 70 is mentioned in order to simplify the description and presentation of the claims, this expression being taken to cover the two diameters $D_{11}$, $D_{12}$.

This "diameter" is in any event larger than the diameter $D_2$ of the discharge chamber 13.

The enlarged FIG. 2B shows the annular cross section of the dead volume 70, emphasized by a dash parallel to the axis XX and corresponding to the geometric extension of the cylindrical surface 131 of the wall of the discharge chamber 13. The axial "height" $L_1$ along the axis XX of the dead volume 70 is formed by the recess 152 in the base 151 of the cavity and the height of the shim 60. It is to be noted that this shim 60 varies only slightly in thickness (direction XX). In the event of a greater variation in the thickness of the shim 60, the depth (axial direction XX) of the recess 152 in the base 151 of the cavity 15 can be adjusted in order to have a sufficient dead volume 70, which is situated primarily in the extension of the conical surface 31 of the seat 30, so as to be situated on the profile of the conical liquid jet, which passes below the ball 21 of the needle 20 when the latter opens.

In other words, the dead volume 70 falls into the lower part of the discharge chamber 13 below the outlet apertures 14 in the extension of the conical surface 31 of the valve seat 30.

The dead volume 70 is separate from the discharge chamber 13 and clearly separated by outlet apertures 14. It lies opposite the upper part 132 of the chamber 13, which forms the part of the volume of the chamber 13 in which a static pressure prevails.

According to the invention the dead volume 70 has the following dimensional features:

$$D_{11} > D_2 \, D_{12} > D_2$$

$$L_1 \leq L_2$$

$D_{11}$ inside diameter of the annular shim 60
$D_{12}$ diameter of the recess 152
$D_2$ diameter of the discharge chamber 13
$L_1$ axial length of the dead volume 70
$L_2$ axial distance between the upper side of the valve body 50 and the outlet apertures 14.

It must be emphasized in connection with the enlarged representation in FIG. 2B that an equivalent dead volume 70 cannot be produced by an overall enlargement of the discharge chamber 13. It is essential that the dead volume 70 be distinctly separated from the discharge chamber 13 and that it be situated below the outlet aperture(s) 14.

Figure 3:
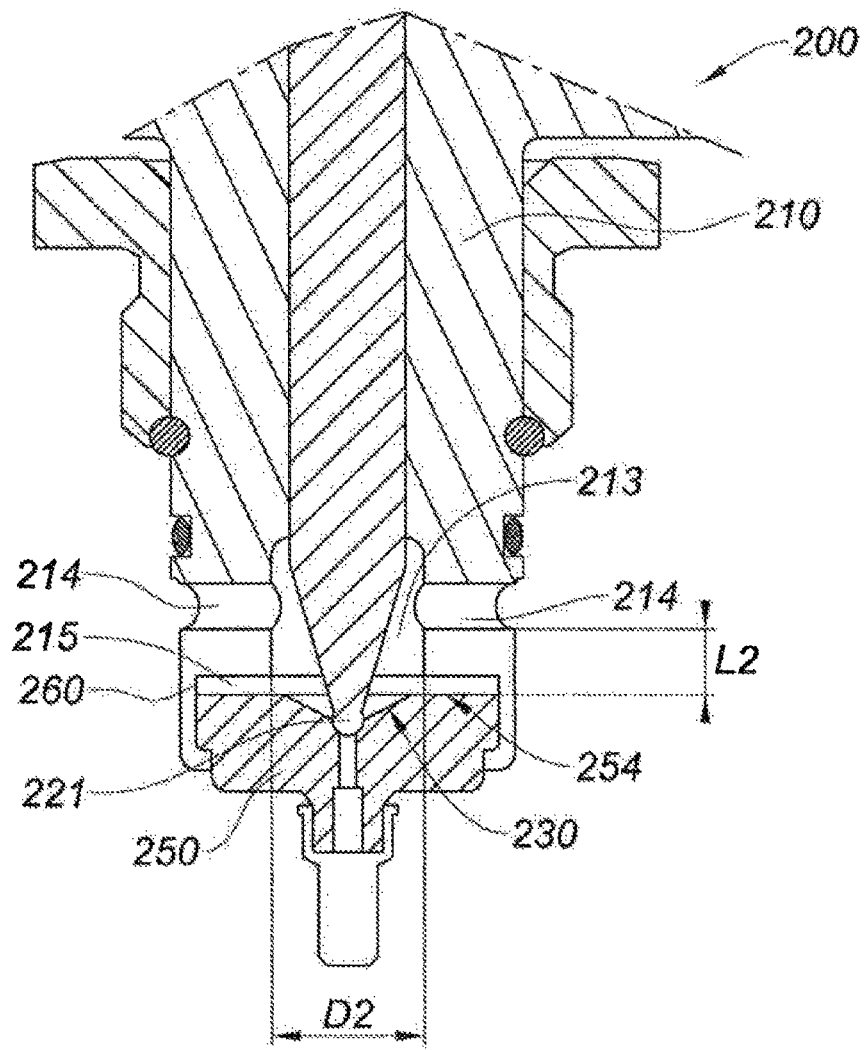
FIG. 3 shows an axial sectional view of a known regulator.

FIG. 3 by way of comparison shows the end of a known pressure regulator 200, which comprises a solenoid valve body 210, which terminates in a bore, which opens into the seat of the valve 230. This is closed by the piston of the solenoid valve in the form of a needle 220, which here interacts with the valve seat 230 via a ball 221. The valve body 250 is attached to the base of the cavity 215 by the solenoid valve body 210 with the insertion of a shim 260. It is flanged into the solenoid valve body. The annular shim 260 has an inside diameter $D_2$ equal to that of the discharge chamber 213 and an axial length $L_2$ along the axis XX between the upper side 254 of the valve body 250, defining the discharge chamber 213 and outlet apertures 214 to the return circuit.

PARTS LIST

10 solenoid valve body
11 front end
12 rear end
13 discharge chamber
131 cylindrical wall
132 upper part
14 outlet aperture/bore
15 cavity
151 base of the cavity
152 recess
153 wall
20 piston/needle
21 ball
25 return spring
30 valve seat
31 conical surface
32 spherical cup
40 solenoid valve/coil
41 rotor
50 inlet valve body
51 inlet bore
52 bore of reduced cross section
53 flange shoulder
54 upper side of the valve body
55 lower surface
56 sleeve
57 screen filter
60 shim
61 inner cylindrical surface 70 dead volume
100 pressure regulator

The invention claimed is:

1. A pressure regulator for a high-pressure rail of a system for injecting fuel into an internal combustion engine, comprising a solenoid valve body (10), which accommodates a solenoid (40), wherein the solenoid controls a needle (20) that closes a valve seat (30), wherein the valve seat is connected to a high-pressure inlet and opens into a discharge chamber (13), wherein the discharge chamber includes outlet apertures (14) configured to communicate with a liquid return circuit, wherein a rear side (12) of the solenoid valve body (10) accommodates a coil, which controls the opening of an armature (41), wherein the armature is fixedly connected to the needle (20) and is subject to a closing return spring (25), wherein a front side (11) of the solenoid valve body (10), in an axis (XX) of the needle (20), comprises the discharge chamber (13), which surrounds the needle (20) and extends through a cavity (15) accommodating an inlet valve body (50), wherein a bore (51), which opens into the valve seat (30), passes axially through the valve body, wherein the discharge chamber (13), through which the needle (20) axially passes, and the outlet apertures (14), which are connected to the liquid return circuit, open transversely into a wall (131) in the discharge chamber (13) below an upper part (132) of the chamber, wherein above a surface (54) of the valve body (50), which forms a base of the discharge chamber (13) and has the valve seat (30) at a center of the surface (54), said regulator comprises an annular enlargement (70) of the discharge chamber (13) below the outlet apertures (14) in an extension of a conical surface (31) which constitutes the valve seat (30) and forms an annular dead volume (70), and wherein the dead volume (70) has the following dimensional features: a diameter $D_1$ ($D_{11}$, $D_{12}$) greater than a diameter $D_2$ of the discharge chamber, an axial length ($L_1$) smaller than or equal to an axial length of the discharge chamber (13) between the upper surface (54) of the valve body (50) and the apertures (14), which communicate with the liquid return circuit.

2. The pressure regulator as claimed in claim 1, characterized in that the valve body (50) is accommodated in the cavity (15) at the front side (11) of the solenoid valve body (10) with an insertion of an annular shim (60), an inside diameter ($D_2$) of which forms at least a part of the height of the annular dead volume (70).

3. The pressure regulator as claimed in claim 1, characterized in that the valve body (50) is flanged into the cavity (15).

4. The pressure regulator as claimed in claim 1, characterized in that the valve body (50) is retained in the cavity (15) by a flange formed by a wall (153) of the valve body.

5. The pressure regulator as claimed in claim 4, characterized in that an external contour of the valve body (50) forms a flange shoulder (53) engaged by the flange.

* * * * *